United States Patent [19]

Seever

[11] 4,217,116
[45] Aug. 12, 1980

[54] METHOD AND APPARATUS FOR THE CLEANING OF THE SURFACE OF FILTER PANELS IN A FLUID PASSAGEWAY

[76] Inventor: John Seever, 120-F British Lake Dr., Greensboro, N.C. 27410

[21] Appl. No.: 910,472

[22] Filed: May 30, 1978

[51] Int. Cl.² .................... B01D 46/10; B01D 46/46
[52] U.S. Cl. ........................................ 55/96; 55/126; 55/212; 55/283; 55/288; 55/304; 55/315; 55/422; 55/493; 210/79; 210/106; 210/407; 210/446
[58] Field of Search ............... 55/21, 96, 213, 283, 55/288, 304, 422, 428, 126, 212, 315, 493; 210/79, 106, 390, 392, 395, 407, 446

[56] References Cited

U.S. PATENT DOCUMENTS

| | | | |
|---|---|---|---|
| 1,597,051 | 8/1926 | Brown | 55/213 |
| 2,678,701 | 5/1954 | Wright | 55/422 X |
| 3,230,033 | 1/1966 | Hamilton et al. | 55/262 X |
| 3,395,518 | 8/1968 | Krane | 55/290 |
| 3,455,821 | 7/1969 | Aremaa | 210/414 |
| 3,543,483 | 12/1970 | Sheehan | 55/272 |
| 3,606,733 | 9/1971 | Arstikaitis | 55/112 |
| 3,653,188 | 4/1972 | Fisher et al. | 55/283 |
| 3,751,885 | 8/1973 | McNeely | 55/267 |
| 3,756,416 | 9/1973 | Wood | 55/96 X |
| 3,766,715 | 10/1973 | Archer | 55/96 |
| 3,778,982 | 12/1973 | Birke | 55/290 |
| 3,839,848 | 10/1974 | Wood et al. | 55/96 |
| 3,887,341 | 6/1975 | Sutter | 55/96 |
| 3,957,639 | 5/1976 | Schoen et al. | 210/107 |
| 3,966,434 | 6/1976 | Frazier | 55/96 |
| 3,984,216 | 10/1976 | Smortchevsky | 55/13 |

FOREIGN PATENT DOCUMENTS 76471 10/1970 Fed. Rep. of Germany .............. 55/97

Primary Examiner—Kathleen J. Prunner

[57] ABSTRACT

In a fluid passageway a filter panel is selectively moved out of its normal position extending across the fluid passageway to a dumping position out of the fluid passageway such that particulate matter collected thereon is removed responsive to the movement of a baffle plate from a normal position out of the fluid passageway into a position blocking the fluid passageway. Thereby passage of air through the fluid passageway is prevented during the time the filter panel is out of its normal position. In a preferred embodiment a linking mechanism connects the baffle plate and filter panel together so that movement of the baffle plate to the blocking position causes the filter panel to drop to a dumping position and return of the filter panel to its filter position causes the baffle plate to drop to its normal position. The whole sequence is instituted responsive to buildup of particulate matter on the filter panel.

8 Claims, 5 Drawing Figures

METHOD AND APPARATUS FOR THE CLEANING OF THE SURFACE OF FILTER PANELS IN A FLUID PASSAGEWAY

SUMMARY OF THE PRESENT INVENTION

This invention relates to an improved process and apparatus for removing the buildup of particulate matter on the surface of a filter panel or screen positioned in a fluid passageway. In order to properly remove the particulate matter and prevent passage of contaminated fluid while the particulate matter is being removed from the filter panel, the fluid passageway should be temporarily blocked while the particulate matter is being removed from the filter panel. One known use of such apparatus is as a pre-filter for electrostatic air cleaners is remove heavy particulate matter before subjecting the air stream to the electrostatic air cleaner. This makes electrostatics useful in entirely new environments.

According to the present invention, in order to accomplish such result, there is provided a hingedly mounted filter member and a hingedly mounted baffle member. Normally the filter member is in position across the fluid passageway carrying out its function of removing contaminants and particulate matter from the gas stream passing therethrough. However, periodically the contaminants and particulate matter build up on the surface of the filter panel to such an extent that they must be removed. In accordance with the invention this removal is effected by first moving the baffle member up into a position blocking the passage of fluid through the passageway. As the baffle member is moved into its blocking position the filter panel is caused to drop down to a position where the frame of the panel engages an abutment and the sharp impact causes the contaminants on the bottom side thereof to drop into a collection hopper. The filter panel is then moved back into normal position causing the baffle member to drop out of its blocking position and into its normal position covering the hopper.

In order to effect the cooperating relationship between the baffle member and the filter panel the activating mechanism that raises first the baffle member then the filter member includes a linking mechanism which cooperatively connects the baffle and the filter. So arranged, as the baffle member is elevated to its blocking position in the fluid passageway a connecting rod initiates pivotal movement of the filter panel about its hinge causing the panel to drop by gravity down to the dumping position. Then as the filter panel is subsequently raised the connecting rod similarly initiates pivotal movement of the baffle member causing it to drop by gravity to its normal position out of the fluid passageway.

It is therefore one object of the present invention to provide a simple, inexpensive, self-cleaning surface loading filter or pre-filter apparatus.

It is another object of the present invention to provide an apparatus and method for sequentially blocking an air or fluid passageway, removing the filter panel from its normal position therein for cleaning of the surface thereof, returning the filter panel and unblocking the passageway so that no unfiltered air can pass therethrough during the cleaning operation.

Another object of the present invention is to provide an apparatus of the type described in which the baffle panel is moved into position blocking the fluid passageway and the filter panel is moved to a dumping position responsive to the aforementioned movement of the baffle member.

It is yet another object of the present invention to provide an apparatus of the type described in which the surface of the filter panel is periodically cleaned and the fluid passageway is automatically blocked during the cleaning operation.

Other objects and a fuller understanding of the invention will become apparent from reading the following detailed description of a preferred embodiment along with the accompanying drawings in which.

DETAILED DESCRIPTION OF A PREFERRED EMBODIMENT

Figure 1:
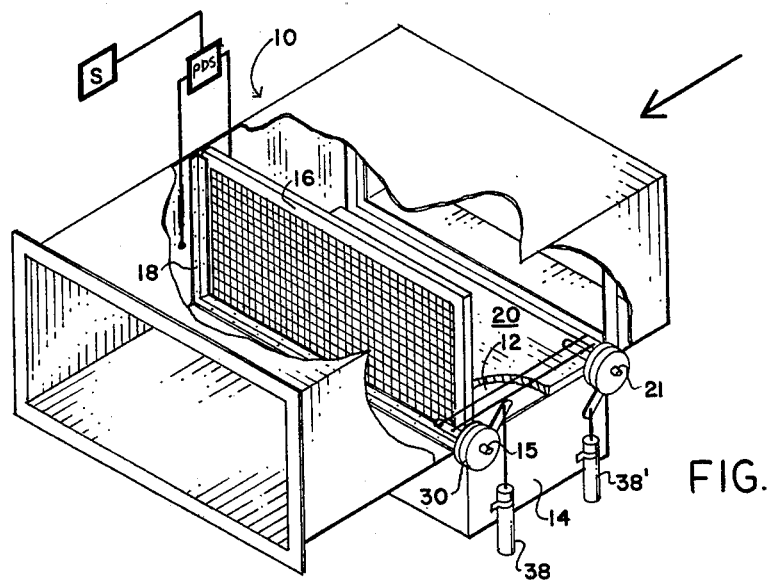
FIG. 1 is a perspective view of the filter portion of a fluid passageway illustrating the apparatus according to the invention with the filter in its operative (normal) position and the baffle in its down position.
Figure 2:
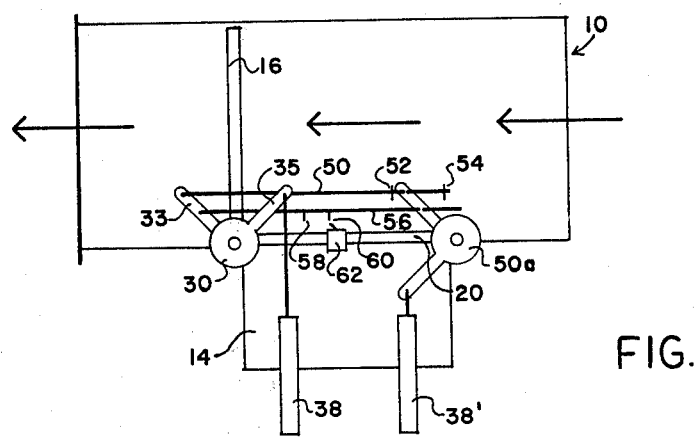
FIG. 2 is a side schematic view of the filter portion of a fluid passageway illustrating the invention by showing the relationship of the filter frame and the baffle in the normal position.
Figure 3:
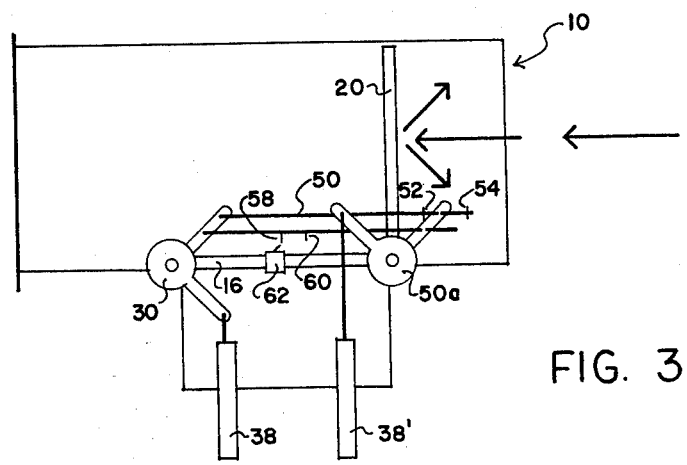
FIG. 3 is a side schematic view similar to FIG. 2, except illustrating the filter frame and baffle member in the dumping position.

Turning now to the drawings, particularly to FIG. 1, there is illustrated a section of duct work 10 having top, bottom, and side walls through which a gas or other fluid stream passes. Such duct work may be formed of galvanized sheet material, aluminum, steel, plastic or the like. The material is not important to this invention.

In the area of the duct work 10 set aside as the filtering portion there is provided an opening 12 extending across the floor of the duct 10. A hopper or collection chamber 14 is secured to the underside of the duct 10 beneath the opening 12 to receive material deposited therethrough as will be described hereinafter.

A filter screen or panel 16 is attached along the bottom edge thereof to a pivot rod 15 extending transversely across the floor of the duct 10 at a point slightly downstream of the opening 12. The filter screen 16 is of the surface loading type and of such a size and dimension as to substantially fill the interior of the duct 10 when in the raised or operating position as illustrated in FIG. 1. The filter material is preferably a 70 mesh wire cloth. The height of the screen 16 is substantially the same or less than the width of opening 12 so as to drop contaminants and particulate matter through the opening 12 when the filter panel is rapped against the floor of the duct 10. A flange 18 extends inwardly from the walls of duct 10 to form a barrier against which the filter panel 16 engages when in the upright operating position.

An imperforate baffle plate or member 20 is pivotally attached by means of a pivot rod 21 extending across the bottom wall of duct 10 at a point slightly upstream of the opening 12 and extends substantially across the interior of the duct 10. So arranged, when the baffle plate 20 is in the upstanding position it effectively blocks passage of air or fluid through the passageway formed by duct 10. The baffle is of substantially the same dimension or slightly larger than opening 12 so that when in the lowered, normal position the baffle member 20 covers opening 12 so that no air escapes down into the hopper 14 therebelow.

Figure 4:
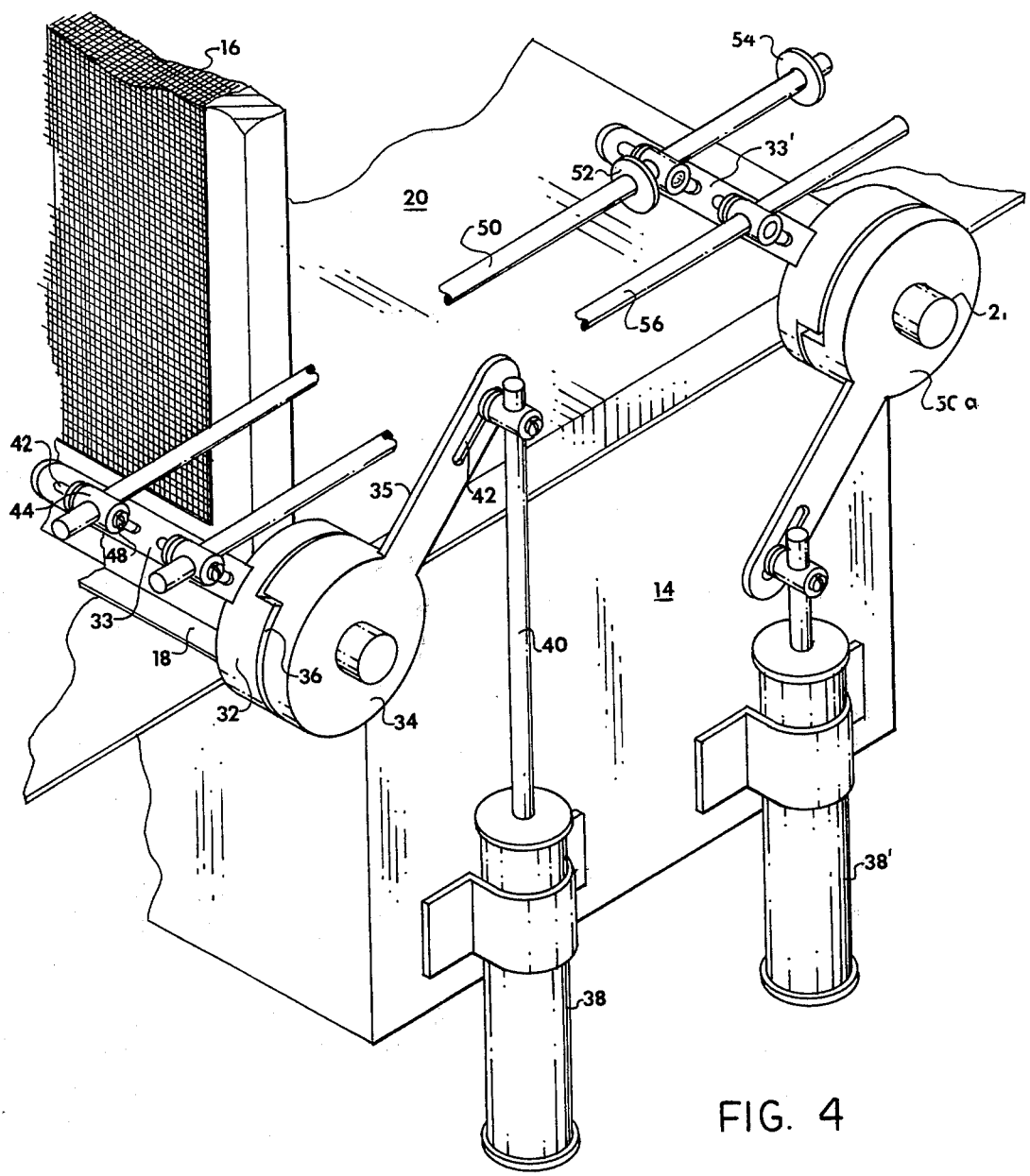
FIG. 4 is an enlarged perspective view illustrating the activating mechanism and the linking mechanism which causes the apparatus to function as intended.

In order to control the movement of the filter panel 16 and baffle plate 20 there is provided an operating mechanism as illustrated in FIG. 4. First of all filter screen 16 includes an extension of the pivot rod 15 about which the panel 16 rotates. A ratchet collar means 30 is mounted on the rotating rod 15 and, as illustrated in FIG. 4, includes two ratchet members 32,34 with inner member 32 being secured to the rod 15 in non-rotating relationship thereto, and outer member 34 being mounted on rod 15 in such a manner as to rotate respective thereto although being axially held adjacent inner member 32. The interface 36 between the first ratchet member 32 and second ratchet member 34 includes longitudinal walls 32a, 34a such that movement of outer member 34 in a counterclockwise direction will cause rotation of the member 32 and rod 15 in a similar direction. However, return motion of the outer member 34 in the clockwise direction will result in no rotation of the operating rod 15 or inner member 32. A connecting arm 33,35 extends radially outwardly from each of the members 32,34 respectively and each arm includes a slot 42 therein for purposes to be described hereinafter. A pneumatic air cylinder 38 is attached to the outer wall of the hopper 14 at a position slightly below the ratchet member 30 and has the piston 40 thereof operatively connected to the operating arm 35 in some suitable conventional manner. So arranged, when the piston 40 is extended as when the cylinder is activated, the ratchet member 30 is caused to rotate counterclockwise approximately 90° causing a lifting of the filter panel 16. Immediately upon reaching the upright position the air in the cylinder 38 is bled off and the piston 40 retracted as will be explained hereinafter. Due to the ratchet effect, however, the filter panel 16 remains in the upright position even though member 34 is returned to its normal lowered position.

A similar ratchet member 50a is provided for the baffle member 20 and is attached to the operating rod 21 thereof in the same manner as described hereinabove with the one exception that activation of the pneumatic cylinder 38' thereof causes a clockwise rotation of the operating rod 21 and baffle plate 20.

Figure 5:
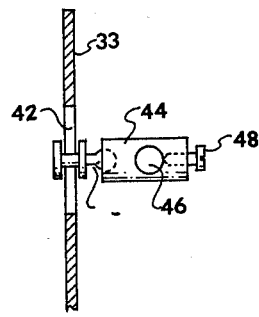
FIG. 5 is an enlarged perspective view of one of the connecting linkages utilized in the preferred embodiment.

Activating arm 33 of inner member 32 includes a slot 42 therein which slot 42 receives a connecting linkage 44 of the type illustrated in FIG. 5 secured therein. The connecting linkage 44 has an opening 46 therein through which one end of a control rod 50 is inserted and secured by a set screw 48. The linkage 44 includes a ball and socket joint 45 so as to allow control rod 50 to pivot in a slight arcuate motion; however, the linkage 44 is secured within slot 42 so that it does not slide therein during arcuate motion of the activating arm 33. The other end of the control rod 50 is inserted through a similar linkage 44; however, no set screw is applied in this instance so that the control rod 50 is free to slide back and forth within the linkage 44.

A pair of collars 52,54 are secured to operating rod 50 on either side of the arm 33' and move therewith for reasons to be described hereinafter. Also a follower rod 56 with a spaced pair of depending lugs 58,60 extend between the arms 33,33' and engage a limit switch 62 as the rod 56 moves back and forth.

In operation, when the filter panel 16 becomes loaded beyond a predescribed level as measured by the pressure drop sensor PDS, or at prescribed time intervals the entire apparatus hereinabove is activated by a control circuit S of conventional design. First, the fan (not shown) which draws air through the filter panel is shut off and the pneumatic cylinder 38' for the baffle is activated. The baffle 20 is normally in a lowered position covering the opening 12, upon activation of pneumatic cylinder 38' the ratchet mechanism 50a is rotated clockwise causing a resulting rotation of the rotating rod 21 and the baffle plate 20 to an upright position. As the ratchet mechanism 50a rotates, the activating arm 33' engages the right hand collar 54 of the operating rod 50 and initiates a corresponding clockwise motion on the arm 33. The weight of the filter panel causes the operating arm 33 and the ratchet member 32 to rotate clockwise until the filter panel falls into a position over opening 12. The resulting movement of the filter panel by gravity causes further movement of operating rod 50 to the right to the extent that collar 52 engages the operating arm 33' and causes the baffle plate to be securely held in its upright position. Also, responsive to movement of the operating rod 50 to the right the follower rod 56 moves to the right and activating finger 58 engages the switch 62. Movement of switch 62 to the right electrically activates a signal which bleeds the air from pneumatic cylinder 38' causing the outer ratchet member 50a to rotate counterclockwise to its down position. Simultaneously pneumatic cylinder 38 is activated which causes the rotation of the ratchet member 30 in a counterclockwise direction thereby lifting the filter screen 16 back up to its filter position. As the filter panel 16 returns to its upright position the activator rod 50 is moved toward the left and the collar 54 causes the activating arm 33' of ratchet member 50a to begin moving in a counterclockwise direction whereupon the weight of the baffle plate and the force of gravity will cause the baffle to return to its lowermost position closing the opening 12. As a result activating arm 33' pushes against collar 52 thereby urging the filter screen to its fully upright position and resisting movement in the clockwise direction. As the aforementioned step occurs the finger 60 of the follower rod 56 pushes the switch back to the other mode which bleeds the air from the pneumatic cylinder causing the outer ratchet member 34 to return to its down position and at the same time reactivates the fan of the system causing a complete reactivation of the system. The elapsed time of the above cycle is approximately eight seconds.

Although a preferred embodiment has been shown and described in detail hereinabove it is apparent that various changes and modifications might be made without departing from the scope of the invention which is set forth in the following claims.

What is claimed is:

1. A filter apparatus for cleaning up a contaminated fluid stream, said apparatus comprising:
(a) a duct having top, bottom, and side walls surrounding said fluid stream and forming a fluid passageway therein, a selected one of said duct walls including an opening therein and an abutment surrounding said opening;
(b) a filter screen having an upstream surface against which said fluid stream impinges, said filter screen being positioned within said duct and movable between a normal position extending transversely across said fluid stream such that particulate matter carried by said fluid stream is removed from said fluid stream by said filter screen and a dumping position removed from said stream with said upstream surface of said filter screen facing said opening in said duct wall and said filter screen striking against said abutment when said filter screen is moved to said dumping position such that the particulate matter built up on said filter screen is caused to fall through said opening;

(c) a baffle plate positioned within said duct and movable between a normal position out of said fluid stream and a second position extending transversely across said fluid stream and blocking passage of fluid therethrough;

(d) said filter screen and said baffle plate being so connected that movement of said filter screen from its normal to said dumping position occurs responsive to movement of said baffle plate from its normal position to its second position, and return of said baffle plate to its normal position occurs responsive to return of said filter screen to its normal position;

whereby the particulate matter carried by said fluid stream is removed from said filter screen and said fluid stream via said opening in said duct wall.

2. The apparatus according to claim 1 wherein said baffle plate is positioned upstream of said filter screen and each of said baffle plate and said filter screen are pivotally attached, about a selected one of their respective edges along said selected duct wall having said opening therein, in said fluid passageway transverse to said fluid stream.

3. The apparatus according to claim 2 wherein said normal position of said filter screen is upright while said normal position of said baffle plate is horizontal adjacent the bottom wall of said duct, and the second or dumping position of said filter screen is horizontal in substantially the same position as the normal position of said baffle plate while the blocking position of said baffle plate is upright.

4. The apparatus according to claim 3 and further including a first lifting means attached to said baffle plate, a second lifting means attached to said filter screen and a linking mechanism connecting said baffle plate and said filter screen for initiating lowering of said filter screen responsive to lifting of said baffle plate and lowering of said baffle means responsive to lifting of said filter screen.

5. The apparatus according to claim 4 wherein said first lifting means is a pneumatic cylinder connected to said baffle plate by a first ratchet mechanism and said second lifting means is a pneumatic cylinder connected to said filter screen by a second ratchet mechanism, wherein said filter screen and said baffle plate are lifted to their upright positions by said first and second pneumatic cylinders; however, are free falling to their horizontal position.

6. The apparatus according to claim 5 wherein said linking mechanism includes a connecting rod extending between said first and second ratchet mechanisms.

7. An improved method for removing particulate matter collected on a surface loading filter screen which is operatively positioned within a fluid passageway, said method comprising the steps of:

(a) passing a fluid stream through said filter screen;

(b) periodically activating a baffle plate to block said passageway;

(c) moving said filter screen, responsive to blockage of said passageway, to a dumping position removed from said passageway wherein the particulate matter collected on the surface of said filter screen is dumped into a receptacle outside said passageway;

(d) returning said filter screen to its operating position; and (e) removing said baffle plate from its blocking position responsive to the return of said filter screen to its operating position.

8. The method according to claim 7 wherein step (b) is initiated upon the reaching of a prescribed pressure drop across said filter screen.

* * * * *